US007266381B2

(12) United States Patent
Charles

(10) Patent No.: US 7,266,381 B2
(45) Date of Patent: Sep. 4, 2007

(54) METHOD FOR FILTERING MOBILE TELEPHONE COMMUNICATIONS AND RELATED DEVICE

(75) Inventor: Jean-Pierre Charles, Guyancourt (FR)

(73) Assignee: France Telecom, Paris (FR)

( * ) Notice: Subject to any disclaimer, the term of this patent is extended or adjusted under 35 U.S.C. 154(b) by 243 days.

(21) Appl. No.: 10/416,471

(22) PCT Filed: Nov. 9, 2001

(86) PCT No.: PCT/FR01/03489

§ 371 (c)(1),
(2), (4) Date: Oct. 3, 2003

(87) PCT Pub. No.: WO02/39777

PCT Pub. Date: May 16, 2002

(65) Prior Publication Data

US 2004/0058684 A1    Mar. 25, 2004

(30) Foreign Application Priority Data

Nov. 9, 2000 (FR) .................................. 00 14397

(51) Int. Cl.
*H04Q 7/38*    (2006.01)
(52) U.S. Cl. .................... 455/456.4; 455/450; 455/525
(58) Field of Classification Search .............. 455/456.4, 455/415, 417, 69, 1, 565, 151.1, 450–453, 455/404.1–404.4, 411, 524, 525
See application file for complete search history.

(56) References Cited

U.S. PATENT DOCUMENTS 6,044,069 A * 3/2000 Wan ............................ 370/311
6,687,506 B1 * 2/2004 Girod ....................... 455/456.4
6,832,093 B1 * 12/2004 Ranta ....................... 455/456.4

FOREIGN PATENT DOCUMENTS

| EP | 881851 | 12/1998 |
|----|--------|---------|
| EP | 0998159 | 5/2000 |
| WO | WO96/10893 | 4/1996 |
| WO | WO9834421 A2 * | 8/1998 |

OTHER PUBLICATIONS

Digital Cellular Telecommunications system (Phase 2); Functions related to Mobile Station (MS) in idle mode (GSM 03.22) European Telecommunication Standard, Sep. 1996, p. 24, line 19, p. 25, line 13.

* cited by examiner

*Primary Examiner*—Philip J. Sobutka
(74) *Attorney, Agent, or Firm*—Cohen Pontani Lieberman & Pavane LLP

(57) ABSTRACT

A method of filtering calls between a mobile network provided with frequency channels and mobile telephones registered with this mobile network. When the mobile telephones are located in a control area (N0), the mobile network includes cells (Zi) associated with respective relays (Ri) each transmitting data specific to their associated cell through a beacon channel among one of the frequency channels of the network. The method includes the parametering in neighboring cells of the control area of a frequency channel of the network corresponding to a transmission channel of a transmitter (D) associated with the control area. The transmitter is never connected to the mobile network so as to operate completely autonomously.

7 Claims, 1 Drawing Sheet

METHOD FOR FILTERING MOBILE TELEPHONE COMMUNICATIONS AND RELATED DEVICE

The present patent application is a non-provisional application of International Application No. PCT/FR01/03489, filed Nov. 9, 2001.

BACKGROUND

1. Field

The present invention generally relates to mobile telephone system.

2. Description of the Related Art

More specifically, the invention relates to a method for filtering calls between a given mobile network and a mobile telephone of this network located in a determined place.

And still more specifically, the invention enables filtering the calls of a particular network at a determined place, preferably a network operating according to the GSM standard, or the UMTS standard.

The considerable boom in mobile telephones, while constituting an advantage in many respects, also entails certain drawbacks.

In particular, it would be desirable to limit, or even prohibit the communication of such equipment in certain places; for example, the case may be cited of theaters, churches, or other public or private premises wherein it is undesirable that mobile user conversations should disturb the environment.

It would thus be advantageous to enable operators running mobile networks (e.g. Itinéris—registered trademark—in France) to set up filtering for their subscribers' calls when they are in certain places.

This would, in fact, constitute an improvement in the service provided by the operator.

Broadband jamming devices are known, which can be used for neutralizing all mobile telephone communications.

But a major drawback associated with these devices is that they neutralize all the incoming and outgoing radio communications of all equipment over a very wide frequency band without distinction, and disrupt the operation of equipment having nothing to do with the mobile network whose calls it would be desirable to filter.

Moreover, regulatory constraints require certain types of calls not to be restricted, for example mobile users' calls to certain emergency services; the above-mentioned broadband jammers obviously do not observe this legal obligation.

Furthermore, jamming devices are known from FR 2 764 145 and FR 2 764 144 whose purpose is to limit the volume to be jammed by adapting the power of the jamming signal according to the volume and configuration of the space to be protected.

In these devices, the jamming signal is transmitted while sweeping the frequency ranges used by radio telephones. But such devices, which carry out jamming over all the frequencies used by radio telephones, disrupt the general operation of the network, in particular in cells located close to the area to be protected.

In addition, in this case the jamming is "brutal", users entering the area to be protected not having the possibility of ending their communications.

A jamming device is also known from FR 2 779 610 detecting the presence of mobiles in a given area. But here again, the jamming disrupts the operation of the network and does not allow users to end their communications, which is a major drawback.

SUMMARY

The object of the invention is to meet the above-mentioned needs and constraints (it will be seen that a preferred application of the invention relates to the filtering of calls on a network operating according to the GSM standard—it should be pointed out, however, that the invention also applies to networks operating in accordance with standards similar to the GSM standard, for example the UMTS standard).

In order to achieve this object, the invention provides a method of filtering calls between a mobile network provided with frequency channels and mobile telephones registered with this mobile network, when the mobile telephones are located in a control area, the mobile network comprising a plurality of cells associated with respective relays each transmitting data specific to their associated cell through a beacon channel among one of the frequency channels of the network, characterized in that the method includes the parametering in the neighboring cells of the control area of a frequency channel of the network corresponding to a transmission channel of a transmitter associated with said control area, said transmitter not being connected to the network.

Other aspects of the method according to the invention are as follows:

said transmitter transmits on its transmission channel through logical channels similar to those of a beacon channel of a cell relay, in particular through a BCCH logical channel, the transmission of said transmitter is accepted by the mobile telephones located within said control area (N0) as a beacon channel transmission of an additional cell of the network, so that the transmission area of said transmitter is a candidate for the selection/reselection procedures, and the incoming calls to mobiles having selected/reselected the transmitter of said control area are neutralized, no receiver is associated with said transmitter, so that when a mobile telephone transmits an access request on the RACH logical channel of said transmission channel, a reselection of neighboring cells will be automatically initiated, for want of any response, the transmitter is associated with reception means capable of decoding the contents of random access messages transmitted by the mobile telephones located within the control area, so as to prohibit outgoing calls from said mobile telephones to the network, the reception means associated with the transmitter are capable of identifying the CHANNEL REQUEST type access request messages transmitted by a mobile telephone seeking to be connected to the network, the transmitter is also associated with a memory including a call types file, and with means for determining the reason for the access request of a mobile telephone, and the transmitter receiving a CHANNEL REQUEST type access request:

does not send any response to the mobile telephone, causing a reselection of a network cell by the mobile, in the event that the reason for the mobile telephone's access request corresponds to a determined reason, transmits on its transmission channel an IMMEDIATE ASSIGNMENT REJECT type message indicating that no request is acceptable at the moment, in the event that the reason for the mobile telephone's access request does not correspond to said determined reason, so that the outgoing call from the mobile telephone will only be routed to the network if the reason for the call corresponds to a determined reason, the transmission of said transmitter is performed according to a time framing of eight time intervals, only the first time interval of each frame actually being used for the transmission of certain logical channels, the transmitter transmits a list of beacon channels of cells which are its neighbors, the location area parameter transmitted on the transmitter's transmission channel is identical to the location area parameter of the beacon channels of the surrounding cells, means are provided for changing the state of a parameter transmitted on the transmission channel of said transmitter, in order to bar the area associated with the transmitter so that the mobile telephones camping on said area associated with the transmitter automatically reselect a new cell, the transmission channel of said transmitter is registered in a list of beacon channels of neighboring cells, for each cell of the network located close to said transmitter, network cell relays broadcast on the BCCH channel, in addition to a first list of beacon channels of candidate cells for selection/reselection procedures, a second list of beacon channels of candidate cells for the handover procedure, and the transmission channel of said transmitter, stored in the list of candidate cells for selection/reselection of the neighboring cells, is not stored in the second list of these neighboring cells.

And the invention also relates to a device for implementing such a method.

DETAILED DESCRIPTION OF THE INVENTION

Figure 1:
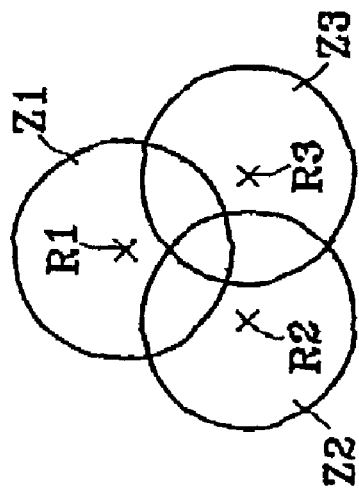
FIG. 1 illustrates a first relay R1 transmitting radio waves over a geographical area or cell Z1.

Referring first of all to FIG. 1, we will recall certain arrangements of the operation of a mobile telephone network. The embodiment of the invention disclosed on the basis of these reminders is a mobile network operating according to the GSM standard, which as has been stated forms a preferred, but not restrictive, application field of the invention.

Accordingly, certain reference documents are recalled, describing important aspects of the GSM standard:

GSM 05.08 (I-ETS 300 034-1 v. 3.8.0): Digital cellular telecommunication system: Radio subsystem link control (Phase 1), GSM 05.08 (ETS 300 578 v. 4.18.2): Digital cellular telecommunication system: Radio subsystem link control (Phase 2), GSM 03.22 (ETS 300 535 v. 4.11.0): Digital cellular telecommunication system: Functions related to mobile station (MS) in idle mode (Phase 2), GSM 11.10 (I-ETS 300 020-1 v. 3.18.0): Digital cellular telecommunication system: Mobile station conformity specifications (Phase 1), GSM 11.10-1 (ETS 300 020-1 v. 4.18.0): Digital cellular telecommunication system: Conformance specifications (Phase 2), GSM 04.08 (ETS 300 557 v. 4.23.1): Digital cellular telecommunication system: Mobile radio interface Layer 3 specification (Phase 2).

This figure schematically depicts a first relay R1 transmitting radio waves over a geographical area or cell Z1, enabling a mobile network to communicate in the upward and downward direction with mobile telephones.

A second relay, R2, is also depicted, which covers a cell Z2 adjacent to the cell Z1.

The relays R1 and R2 obey a set of protocols some of whose main aspects will be briefly described further on in this text.

These protocols are associated with the GSM standard; however, their general principles are also applicable to networks operating according to other standards, for example the UMTS standard.

An operator will thus be able to have a given geographical territory covered by a network thanks to a plurality of cells Zi analogous to the cells Z1 and Z2, each cell Zi being associated with a transmission/reception relay Ri for communicating with the mobiles, each relay Ri being connected to the mobile network.

To ensure continuous coverage of this territory, it is necessary to provide an overlap area between two adjacent cells, which is schematically depicted here by the hatched area R.

A user subscribed to the network thus has the possibility of communicating with the network thanks to his mobile, via the intermediary of one of the relays of this network.

And relay changing procedures are provided so that, in the event that the user moves around the territory, his mobile is associated with the relay for communicating with the network under the best conditions.

These procedures include:

The selection procedure, which enables the mobile to choose a network cell when it is switched on, The reselection procedure, which enables a mobile already switched on but not in communication to reselect a new network cell, in particular when the user equipped with his mobile moves around the territory, The intercellular automatic transfer procedure ("handover", or HO according to widespread English language terminology), for transferring a mobile during communication to a new cell—and thus enabling the user to move about while constantly communicating with the network under the best conditions.

These procedures are continuously active for each cell and for each mobile of the network; they are constantly repeated when the mobile terminal moves around.

And an important parameter that enables these procedures to choose one of the network's cells for a given mobile, is the field level parameter C1 received by the mobile.

This parameter C1 is defined as follows:

C1=(A−Max(B, 0)). In this formula, all the parameters are expressed in dBm.

The parameter A is defined as follows:

A=(level received averaged over several iterations of the abovementioned procedures)−RXLEV_ACCESS_MIN, with:

RXLEV_ACCESS_MIN being a parameter defined as the minimum value of the level received enabling the network to be accessed.

The parameter B is defined as follows:

B=MS_TXPWR_MAX_CCH−P, with:

MS_TXPWR_MAX_CCH: parameter corresponding to the minimum power level allowed for the mobile when accessing the network, P: maximum output power of the mobile.

It is also possible to use a different parameter for the selection/reselection/HO procedures, representative of the level (expressed in dB for example), and/or of the quality of communication between a given mobile and cell (application to a UMTS network for example). It is also possible to use several different parameters according to the procedure, and according to the requirements.

By way of example, some versions of the GSM standard, for example, use a parameter C2 used during reselection, in combination with the parameter C1.

This parameter C2 is defined as follows:

C2=C1+CELL_RESELECT_OFFSET−TEMPORARY_OFFSET

H(PENALTY_TIME−T) if a parameter PENALTY_TIME is equal to 11111 (in binary language), C2=C1−CELL_RESELECT_OFFSET if the parameter PENALTY_TIME is other than 11111, all the parameters here again being expressed in dBm, with:

PENALTY_TIME, CELL_RESELECT_OFFSET and TEMPORARY_OFFSET: parameters linked to each cell, broadcast via the cell relay on the cell's BCCH channel, T: counter linked to the cell, being incremented from 0 up to the value PENALTY_TIME as soon as the cell is entered in a BA(BCCH) list of another cell—a definition will be given below of the BCCH channel (according to the widespread English language acronym Broadcast Common Control Channel) and of the BA(BCCH) list of a cell.

The BCCH channel of a cell is broadcast on a radio channel chosen from the channels usable by the network for enabling mobiles to communicate with the cell relays (the primary GSM band thus comprising 124 radio channels, each with a width of 200 KHz).

The radio channel that broadcasts a BCCH channel may also be referred to by the term "beacon channel". And more generally, either of the terms "beacon channel" and "BCCH" may equally be used to refer to the transmission channel of a cell, and the transmission on this channel.

Each cell may thus have a particular BCCH channel, and each cell broadcasts a BA(BCCH) list of neighboring cells in the form of a list of numbers of radio channels on which the BCCHs of these neighboring cells are broadcast.

For these purposes, the operator of the mobile network sets the parameters of the BA(BCCH) list of the BCCHs (beacon channels) of the neighboring cells in the relay of each cell of the network. And the operator can update this parameter setting as he/she wishes.

And this BCCH is thus used by each cell to broadcast parameters such as the PENALTY_TIME, CELL_RESELECT_OFFSET and TEMPORARY_OFFSET parameters described above, as well as other parameters of state of the cell, destined for mobiles capable of communicating with the cell since they are located in the area associated with the BCCH.

These other parameters of state include among others:

CELL_BAR_ACCESS, binary parameter that can take two values: 0 if the cell is available for routing mobile communications, 1 if it is unavailable (the cell is then said to be "barred"), CELL_BAR_QUALIFY, which is used during reselection in combination with the parameter C2 mentioned above.

Moreover, each cell keeps a list of BCCHs of the neighboring cells up to date in a memory associated with it, and broadcasts this list on its own BCCH.

And each cell also has, among the network channels, logical channels other than its BCCH, for routing mobile communications.

Communications take place on all these channels according to a recurrent time framing of eight time intervals (TI). The initial TI will thus be reserved for the BCCH, the next 7 TI being free for the communication of mobiles with the network.

And the transmissions/receptions within each TI are themselves organized in logical frames by time and/or frequency division, thus defining logical channels; thus there will be several logical channels within the same TI (which is repeated every eight TI), each able to be dedicated to the transmission or reception of information and particular parameters.

Thus, within the BCCH channel of a given cell, each of the different broadcast parameters is associated with a predefined logical channel.

And each mobile can further store in its memory one or more lists of BCCH channels—which amounts to one or more lists of cells, given that the BCCHs of the different cells are registered and stored in a central memory of the network.

In particular, each mobile can store a BA(BCCH) list of candidate cells for the selection and reselection procedures.

When it is in communication with the network, each mobile further uses a BA(SACCH) list of neighboring cells of BCCH candidates solely for the HO, this list being separate or not from the BA(BCCH) list.

The main steps of the selection and reselection procedures, which form a starting point of the invention will now be briefly explained.

The selection procedure, as has been stated, enables choosing a network cell when it is switched on.

In the event that no BCCH list is stored in the mobile seeking a cell, the selection procedure follows the following steps:

during a first step, the mobile sweeps all the radio channels of the network (for example, 124 channels for a primary GSM band network, 374 channels for a network operating according to the DCS 1800 standard, 174 channels for the extended GSM band standard). During this sweep, the mobile evaluates the reception level of each channel and calculates the averaged received level, corresponding to the parameter A mentioned above. This averaged received level calculation is performed on at least 5 level measurements per channel, carried out at regular intervals over a period of 3 to 5 seconds.

during a second step, the mobile chooses the channel having the highest averaged received level and determines whether this channel is a BCCH channel of a cell;

if the channel in question is a BCCH, the mobile tries to synchronize on this channel and reads the contents of this BCCH. If the information read on this BCCH indicates that the associated cell is eligible (in particular parameter CELL_BAR_ACCESS=0), then the mobile chooses this cell for communicating with the network (the mobile is said to "camp" on the cell). If this cell belongs to the mobile's network but is not eligible, the mobile will consult the list of BCCHs of neighboring cells broadcast by this cell for continuing its selection procedure, if the channel having the highest averaged received level is not a BCCH, then the mobile chooses the channel whose averaged received level is immediately below the channel previously chosen, then repeats the procedure disclosed above.

In the case now where the mobile has a list of BCCH in memory when it is switched on, the mobile will first use the channels in this BCCH list for conducting the selection procedure according to the second step disclosed above.

During this procedure, if a cell considered belongs to the desired network but is not eligible, the mobile will use the list of BCCHs broadcast by this cell for completing its search.

If at the conclusion of this first search phase, based on the list of BCCHs that the mobile had stored in memory, no eligible cell has been found, then the mobile resumes the selection procedure as if no list of BCCH had been stored in memory, omitting the channels already examined.

At the time of the initial selection, only the reception level of each BCCH is taken into consideration. If the parameter C1 of the cell initially selected by the mobile subsequently proves to be inferior to that of another eligible cell, the selection will be followed by a reselection in accordance with the steps disclosed below.

The main steps will now be disclosed for the reselection procedure, which enables the mobile in idle mode to continuously choose the most favorable cell for communicating with the network.

At the conclusion of the selection procedure, the mobile camps on a cell, but it continues to monitor the BCCHs present in its BA/(BCCH) list.

For this, for each BCCH present in this list, the mobile keeps a sliding average of the received level up to date (the duration of the averaging being generally between 5 and 60 seconds, or even less for some advanced versions of networks).

The level of the service cell on which the mobile is camped, is also monitored by the mobile at regular intervals (at a frequency rate not exceeding 5 seconds).

A minimum sampling of 5 measurements is required for calculating this averaged level. The same number of sampling measurements is required for the other BCCHs present in the BA/(BCCH) list (this also being valid for the BA/(SACCH) list), these measurements having as far as possible to be distributed uniformly over time over the period of averaging.

Each mobile thus regularly updates the list of the six BCCH carriers having the highest level; these six BCCH belong to the BA(BCCH) list broadcast by the cell on which the mobile is camped.

In order to make sure that it camps on the most appropriate cell, each mobile performs the following operations:

at least every 5 seconds, the mobile calculates the value of the parameter C1 (and if necessary C2) for the service cell, and for the six highest level cells, the mobile reselects a new cell as the service cell if one of the following conditions is met:

the parameter C1 of the service cell becomes negative, for a period of more than 5 seconds (condition RS1), the mobile detects a fault linked to the recognition of paging messages (condition RS2), the service cell enters a "barred" state, i.e. its CELL_BAR_ACCESS parameter has a value equal to 1 (condition RS3), in the event that the reselection procedure uses the parameter C2 as mentioned above, the parameter C2 of one of the cells monitored by the mobile becomes greater than the parameter C2 of the service cell for a period of more than 5 seconds. If this new cell belongs to a new location area, the parameter C1 of this new cell must, for a period of more than 5 seconds, exceed the parameter C1 of the initial service cell by an amount at least equal to a predetermined value, recorded in a parameter CELL_RESELECT_HYSTERESIS. The latter parameter, broadcast by the BCCH of each cell, may have a value between 0 and 14 dB in increments of 2 dB (condition RS4), the mobile's attempts at accessing the service cell remain unsuccessful after a number of tries greater than a predetermined value MAX_RETRANS; so if for any reason the service cell "does not answer" the mobile, the latter resumes the reselection procedure for searching for a new service cell (condition RS5).

It will be noted that in the event that the above-mentioned condition RS4 is involved (which implies that the network is using the parameter C2), reselecting a new service cell value may only occur after a delay of 15 seconds.

In the event of a reselection based on one of the other conditions mentioned above, reselection is immediate; however, the mobile's return onto the initial service cell is only possible after a period of 5 seconds has elapsed.

When the mobile has identified a new service cell by the reselection procedure, it reads the BCCH channel of this new cell in order to make sure that the parameters of this cell assigning the reselection have not changed.

If such is not the case and one of these parameters has been modified since it was first read by the mobile during the reselection procedure, the mobile must check that the reselection condition is still met.

And in the event that reselection is expressed in a change of location area (the location area being an intermediate cell grouping level of a network), a location area update procedure is performed.

It is also possible to favor or discriminate against the reselection of certain cells via the intermediary of a CELL_RESELECT_OFFSET parameter, which is also broadcast by the BCCH channel of each cell.

This parameter may be positive or negative according to the value taken by the PENALTY_TIME parameter mentioned earlier.

The procedures disclosed above thus enable a mobile to communicate with a given network under the best possible conditions. A disclosure will now be made below of the specific arrangements of the method and of the device according to the invention enabling the objects of the invention as stated in the introduction to the present application to be effectively fulfilled.

According to a first variant embodiment of the invention, it is possible to prohibit, over a given geographical area, the routing of all the calls from a given network to mobiles normally communicating with this network.

Such a prohibition may further be temporary, the prohibition being able to be lifted or established at any desired moment.

Figure 2:
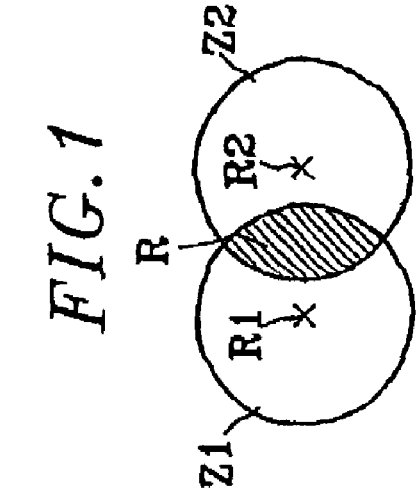
FIG. 2 illustrate a schematic top view of cells Z1, Z2 and Z3 associated with respective relays, R1, R2 and R3.

FIG. 2 is a view similar to FIG. 1, which also depicts a schematic top view of three cells Z1, Z2, Z3 with which are associated three respective relays R1, R2, R3. There are intercellular overlap areas in this figure that enable the achievement of continuous coverage of a territory by the network relays.

Figure 3A:
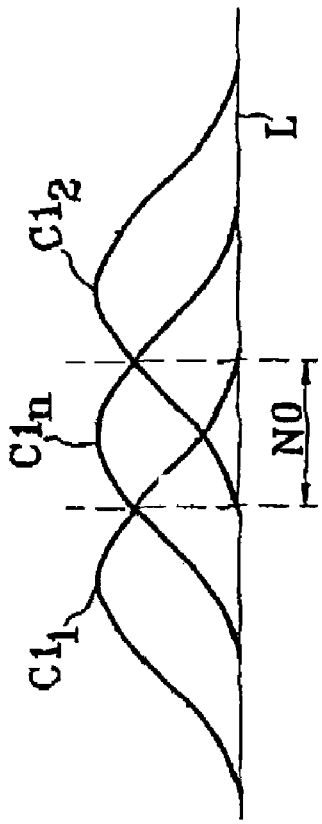
FIG. 3A illustrates an area N situated at the center of cells Z1, Z2 and Z3.

FIG. 3a reproduces the three cells Z1, Z2, Z3 of FIG. 2. This figure also depicts in parallel an area N, here situated at the center of the cells Z1, Z2 and Z3.

The area N covers an area that is usually covered by at least one of the relays R1, R2, R3.

It is pointed out that all the cells and areas in FIGS. 1 to 3a are depicted with a view to schematically representing in the form of regular circular disks the shape and size of each of these areas, which may in reality be adapted according to the local topography, and the propagation characteristics within each cell.

The area N contains a place within which control of communications is wanted; this place may be, for example, a theater, a church, etc., as mentioned in the introduction to the present application.

At the center of the area N that one wishes to protect in this way (as a whole, or partially, according to the relative transmission powers of the different relays used) a device D is placed for transmitting a beacon channel which is specific to it on one of the frequency channels of the network considered.

This transmission has all the characteristics of a transmission on a BCCH channel via the relay of one of the network cells, i.e. it includes all the logical channels of such a transmission, and the parameters usually broadcast on a BCCH channel.

Furthermore, according to an important aspect of the invention, the mobile network operator parameters the relays of each cell of the mobile network situated close to the device D, so as to integrate into the BA(BCCH) list of each of these cells the "dummy BCCH" associated with the transmission of the device D.

And in this way, the transmission channel of the device D is stored by the neighboring cells of the device D, as an additional cell BCCH.

However, the device D is not connected to the network in any form of embodiment of the invention; it operates completely autonomously.

The area N is thus treated as an additional cell. In addition, the network operator controls all the parameters which are broadcast on the beacon channel of the area N, which constitutes a "dummy BCCH".

It will be noted that such a device can only be implemented by the network operator, since the device uses one of the frequencies that are placed at its disposal under a mobile operator license; in addition the parametering of this device requires knowledge of the characteristics of this particular network.

The power transmitted by the device D will determine the radius of action of this device, and may therefore be adjusted according to need.

Thus, the device D transmits like a relay of a cell on a time framing of eight time intervals, only the first time interval being actually used for the transmission of the logical channels of this "dummy BCCH".

D will thus transmit a BA(BCCH) list of BCCHs of the neighboring cells on this channel, this list having been parameetered by the operator like all the other data transmitted by the device D.

And a mobile located close to the device D and seeking to be connected to the network will think it recognizes an additional network cell, all the parameters broadcast by D being consistent with the characteristics of the other cells, in particular neighboring ones.

The parameter of LAC (Location Area Code) must thus be identical to that of the surrounding cells, to prevent any updating of location when mobiles in idle mode enter the area covered by the device D.

The area N thus acts as a "phantom cell", which can be chosen by the mobiles located nearby during selection/reselection procedures. However, the device D, which is not in any way connected to the rest of the network, in this first variant embodiment of the invention is only an illusion that is limited to transmitting.

And this "cell" N, when it is selected by a mobile at the end of a selection or reselection, does not put through any call to the mobile so that the incoming communications to this mobile cannot succeed since the phantom "cell" N is not connected to the network.

Figure 3B:
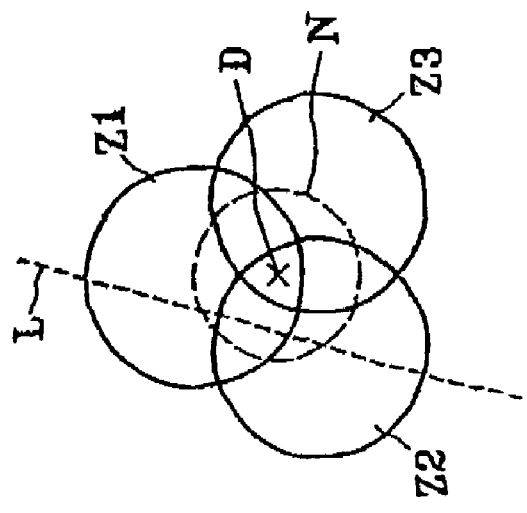
FIG. 3B illustrates distribution of the field levels associated with cells.

FIG. 3b schematically illustrates the distribution of the field levels associated respectively with the cell Z1 (level C1), with the area N (level $C1_N$), and with the cell Z2 (level $C1_2$), along a line L that is depicted in FIG. 3a and that crosses a part of the area N.

It is seen in this figure that there is a central area within which the field level $C1_N$ associated with the transmission of the device D is greater than the field levels $C1_1$ and $C1_2$ of the relays of the neighboring cells; within this central area, marked N0 in FIG. 3b, this will therefore be the "phantom cell" associated with the transmitter D, which will be chosen by the mobiles during selection/reselection procedures.

And once this "phantom cell" is chosen by a mobile, the mobile will only listen to the data transmitted on the dummy BCCH of D, the seven time intervals normally associated with communication with the network in the case of a normal cell being inactive.

Thus, over the first time interval the mobile will receive information similar to that of a BCCH and will thus "think" that it is connected to the network, but in reality it will not be able to receive calls from the network.

It is understood therefore that a mobile that is switched off or in idle mode entering the area N0 will not be able to receive any call from the network, as long as it is camped on the "cell" N.

And it is possible according to the invention to parameter the data transmitted on the dummy BCCH of the "phantom cell" at will; in particular, it is possible to modify the CELL_BAR_ACCESS parameter of this "cell" N so as to bar it at will.

In the event that the "cell" N is thus barred, for example as a result of a manipulation of the operator on the device (by operating a switch, or by programming a specific instruction in a memory associated with the device), or simply by a customer having requested the operator to install the device D in the heart of the area N, the mobiles previously camping on this "cell" N will automatically reselect a new cell of the operator, the condition RS3 mentioned earlier being met, and may again receive incoming calls.

Furthermore, the dummy transmission BCCH of the device D must be registered in the list of neighboring cells BA (BCCH) transmitted by each of the real cells of the network located nearby, which enables the selection/reselection of the "cell" N by a mobile entering the area N0 to be protected.

A mobile in idle mode entering the area covered by the device will thus camp on the area N as soon as the parameter $C1_N$ is greater than the field levels parameter of the neighboring cells, i.e. as soon as the mobile is located within the area N0, which constitutes the actual control area.

And when the same mobile camping on the area N leaves the area N0, the reselection procedure which is iterative will be applied again, so as to allocate the mobile a new network cell where it may again receive incoming calls and communicate with the network without any special restriction.

In the case of a mobile entering the area N0 while it is in communication, and if the operator uses BA(SACCH) lists different from the BA(BCCH) lists used for the selection/reselection procedures, it is possible to enable the mobile to complete its communication before making it camp on the area N.

For this, the choice will be made not to register the dummy BCCH of the "cell" N in the BA(SACCH) lists of the neighboring cells of this area, so as to prevent any attempt at handover to this "cell" N.

Now in the case of a mobile being switched on while it is already located in the area N0, the initial selection may lead to the mobile temporarily camping on a different cell from the "cell" N (for example in the event that the mobile has stored a BA(BCCH) list before being switched off).

However, in this case, the reselection procedure will quickly lead the mobile to camp on this "cell" N, thanks chiefly to the broadcasting by the neighboring cells of BA(BCCH) lists containing the dummy BCCH of this "cell" N.

We have seen that the invention thus enables the effective filtering of communications to mobiles associated with a given network, within a desired area.

It will be further noted that an advantageous aspect of the invention is that its use does not disrupt the general operation of the mobile network.

Now when a user wishes to call via the intermediary of this network while he is in the area N0, given that the mobile is camped on the "cell" N, it transmits an access request to this "cell" N on the RACH logical channel (which is the logical channel for initiating communications over the time interval number 0 of the dummy BCCH).

These access requests will be unsuccessful since the "cell" N does not have a receiver for receiving and processing such an access request.

Once a predefined maximum number of access attempts has been reached, corresponding to the parameter MAX_RETRANS, a cell reselection is automatically initiated, the condition RS5 being met.

Thus the mobile will camp on one of the neighboring cells of the "cell" N and it may again access the network via the intermediary of this new cell, which is registered in the BA(BCCH) list of the "cell" N.

Once the communication is concluded, the mobile will return to camp on the "cell" N due to the iterations of the reselection procedure.

Thus the first variant of the invention disclosed above can be used to prohibit mobiles of a given network located in a place where one wishes to filter communications, from receiving incoming calls, but allows these same mobiles to make calls via the intermediary of the network.

In a second variant of the invention, which reproduces the arrangements of the first variant disclosed above regarding incoming calls (so that the mobiles associated with a given network cannot receive calls from this network when they are located in an area that one wishes to control), the mobiles of the network are further prohibited from making calls to their network when they are located in this area to be controlled.

However, arrangements are provided, as will be explained below, to enable these mobiles to let through certain calls even when they are located in the controlled area. In particular this enables the fulfillment of certain regulatory obligations, requiring the permanent free access of mobiles to emergency numbers.

In this variant of the invention, the device D disclosed above is not a simple transmitter, but also has a simplified receiver for decoding the contents of random access messages transmitted by the mobiles on the RACH channel.

The receiver of the device D can thus identify messages of the CHANNEL REQUEST type transmitted by a mobile seeking to be connected to the network. This CHANNEL REQUEST message is transmitted by the network's mobiles on a RACH logical channel of the cell—real or "phantom"—on which the mobile is camped.

Thus, the access request to the network from a mobile camping on the "cell" N as a result of the selection/reselection procedures will be identified by the device D.

And the CHANNEL REQUEST messages transmitted on the RACH logical channel comprise two parts:

a first part including a call reason parameter describing the nature of the communication that the mobile requires. This parameter may thus take different known values of the mobile and the network, each value corresponding to a call reason: emergency call, call resumption, response to a paging message, communication channel request, another type of channel request (signaling), location update, etc.

a second part comprising a reference for identifying the mobile. This part enables the network relay—or here the receiver of the device D—which receives the CHANNEL REQUEST to identify and recognize each mobile.

And the device D, thanks to the call types file copied into its memory, can determine the reason for the access request from a mobile that is camped on the "cell" N and which is seeking to call the network via the intermediary of this "cell".

If the value of the call reason parameter corresponds to an emergency call, (CHANNEL REQUEST starting with "101"), the device D does not send any response to the mobile, thus causing a reselection of another cell by the mobile since the condition RS5 is then met, so that the emergency call will be routed to the network via this other cell.

If now the call reason parameter corresponds to a different reason, the transmitter of the device D transmits on its beacon channel an IMMEDIATE ASSIGNMENT REJECT message, which indicates that no resource is available.

In this case the mobile "thinks" that the cell with which it seeks to communicate is unavailable. The mobile then waits for a time delay period T3122, set by the operator and capable of being between 0 and 255 seconds in the case of the GSM standard, before transmitting a new CHANNEL REQUEST message on the RACH logical channel of the "cell" N.

And if the mobile persists at the conclusion of this period T3122 and transmits a new CHANNEL REQUEST to the "cell" N, the device D will again recognize the reason for the request and will again transmit an IMMEDIATE ASSIGNMENT REJECT message to the mobile (the mobile being recognized by the transmitter of the device D thanks to the second part of the CHANNEL REQUEST message, which enables the transmitter of the device D to transmit to this particular mobile).

It is obviously possible to define other types of calls having to be routed by causing a reselection, each of the different values of the call reason parameter stored by the device being able to be marked in the memory of D as having to give rise to reselection for call routing, or not.

Thus, in this second variant of the invention the mobiles associated with a given network are prohibited from accessing this network when the mobiles are in a given area, certain types of calls, however, being able to be routed.

And it is also recalled that while the invention was disclosed above more particularly with reference to the GSM standard, its application to networks operating according to other versions of this standard, or other standards, for example the UMTS standard, is naturally conceivable. Thus, the numeric values appearing in this disclosure are related to the current versions of the standards referred to, and do not under any circumstance constitute a limitation of the invention.

The invention claimed is:

1. A method of filtering calls between a mobile network provided with frequency channels and mobile telephones registered with this mobile network, when the mobile telephones are located in a control area (N0), the mobile network comprising a plurality of cells (Zi) associated with respective relays (Ri) each transmitting data specific to their associated cell through a beacon channel among one of the frequency channels of the mobile network, the method comprising the steps of:

parametering in neighboring cells of the control area of a frequency channel of the mobile network corresponding to a transmission channel of a transmitter (D) associated with said control area;

transmitting on a transmission channel of said transmitter (D) through a BCCH logical channel;

accepting the transmission of said transmitter by the mobile telephones located within said control area (N0) as a beacon channel transmission of an additional cell of the mobile network, so that the transmission area of said transmitter is a candidate for the selection/reselection procedures, and neutralizing the incoming calls to mobiles having selected/reselected the transmitter of said control area; and associating no receiver with said transmitter (D), so that when a mobile telephone transmits an access request on the RACH logical channel of said transmission channel, a reselection of neighboring cells will be automatically initiated, for want of any response, said transmitter (D) being associated with reception means suitable for decoding the contents of random access messages transmitted by the mobile telephones located within the control area (N0), so as to prohibit outgoing calls from said mobile telephones to the mobile network;

wherein said transmitter is never connected to the mobile network so as to operate completely autonomously, the reception means associated with the transmitter (D) are capable of identifying the CHANNEL REQUEST type access request messages transmitted by a mobile telephone seeking to be connected to the mobile network, the transmitter is also associated with a memory including a call types file, and with means for determining the reason for the access request of a mobile telephone, and the transmitter receiving a CHANNEL REQUEST type access request:

does not send any response to the mobile telephone, causing a reselection of a mobile network cell by the mobile, in the event that the reason for the mobile telephone's access request corresponds to a determined reason, transmits on its transmission channel an IMMEDIATE ASSIGNMENT REJECT type message indicating that no request is acceptable at the moment, in the event that the reason for the mobile telephone's access request does not correspond to said determined reason, so that the outgoing call from the mobile telephone will only be routed to the mobile network if the reason for the call corresponds to a determined reason.

2. The method as claimed in claim 1, wherein the transmission of said transmitter (D) is performed according to a time framing of eight time intervals, only the first time interval of each frame actually being used for the transmission of certain logical channels.

3. The method as claimed in claim 1, wherein the transmitter (D) transmits a list of beacon channels of cells which are its neighbors.

4. The method as claimed in claim 1, wherein the location area parameter transmitted on the transmitter's (D) transmission channel is identical to the location area parameter of the beacon channels of the surrounding cells.

5. The method as claimed in claim 1, further comprising providing means for changing the state of a parameter transmitted on the transmission channel of said transmitter, in order to bar the area associated with the transmitter so that the mobile telephones camping on said area associated with the transmitter automatically reselect a new cell (Zi).

6. The method as claimed in claim 1, wherein the transmission channel of said transmitter (D) is registered in a list of beacon channels of neighboring cells, for each cell (Zi) of the mobile network located close to said transmitter.

7. The method as claimed in claim 6, wherein mobile network cell (Zi) relays (Ri) broadcast on the BCCH channel, in addition to a first list of beacon channels of candidate cells for selection/reselection procedures, a second list of beacon channels of candidate cells for the handover procedure, and the transmission channel of said transmitter, stored in the list of candidate cells for selection/reselection of the neighboring cells, is not stored in the second list of these neighboring cells.

* * * * *